(12) United States Patent
Lundholm

(10) Patent No.: US 11,214,945 B2
(45) Date of Patent: Jan. 4, 2022

(54) PIPE SHAFT MODULE

(71) Applicant: CONCENTUS PROPERTIES AB, Kalix (SE)

(72) Inventor: Anton Lundholm, Kalix (SE)

(73) Assignee: Concentus Properties AB, Kalix (SE)

( * ) Notice: Subject to any disclaimer, the term of this patent is extended or adjusted under 35 U.S.C. 154(b) by 0 days.

(21) Appl. No.: 17/051,972

(22) PCT Filed: May 24, 2019

(86) PCT No.: PCT/SE2019/050481
§ 371 (c)(1),
(2) Date: Oct. 30, 2020

(87) PCT Pub. No.: WO2019/231382
PCT Pub. Date: Dec. 5, 2019

(65) Prior Publication Data
US 2021/0238831 A1    Aug. 5, 2021

(30) Foreign Application Priority Data

May 29, 2018 (SE) .................................. 1850647-7

(51) Int. Cl.
*E03C 1/02* (2006.01)
*E03B 7/09* (2006.01)
(Continued)

(52) U.S. Cl.
CPC .............. *E03C 1/021* (2013.01); *E03B 7/095* (2013.01); *E04C 2/521* (2013.01); *F16L 5/00* (2013.01); *Y10T 137/698* (2015.04)

(58) Field of Classification Search
CPC ........ Y10T 137/698; F16L 5/00; E04C 2/521; E03C 1/021; E03B 7/095
See application file for complete search history.

(56) References Cited

U.S. PATENT DOCUMENTS 2,037,895 A * 4/1936 Gugler ................ E04B 1/34869
52/36.2
2,343,896 A   3/1944 Fishko
(Continued)

FOREIGN PATENT DOCUMENTS

DE    16 58 246 A1   12/1971
DE   295 07 439 U1    6/1995
(Continued)

*Primary Examiner* — Kevin F Murphy
(74) *Attorney, Agent, or Firm* — Dilworth & Barrese, LLP

(57) ABSTRACT

A pipe shaft module and a method for mounting a pipe shaft module in a pipe shaft of a building, said pipe shaft module (1) comprising: —a pipe connection box (5); and—at least one pipe (7a, b, c) which is protruding into the pipe connection box (5) and which is provided to the pipe connection box such that it can slide along its length direction in relation to the pipe connection box, wherein said pipe connection box (5) comprises: —a pipe connection device (11) comprising at least one pipe connector (13a, b, c) for each pipe (7a, b, c) provided in the pipe shaft module (1), wherein said pipe connection device (11) is mounted within the pipe connection box (5) such that it can be moved within the pipe connection box (5) into at least two different positions where one position is a connection position in which the pipe connectors (13a, b, c) are positioned such that one pipe connector (13a, b, c) can be connected to each pipe (7a, b, c) of the pipe shaft module (1).

20 Claims, 5 Drawing Sheets

(51) Int. Cl.
  *F16L 5/00*   (2006.01)
  *E04C 2/52*   (2006.01)

(56) References Cited

U.S. PATENT DOCUMENTS

| | | | | |
|---|---|---|---|---|
| 3,774,631 A * | 11/1973 | Willkins | ............... | F16L 1/10 |
| | | | | 137/357 |
| 4,654,900 A * | 4/1987 | McGhee | ............... | E03C 1/042 |
| | | | | 4/661 |
| 4,919,164 A * | 4/1990 | Barenburg | ............... | E03C 1/01 |
| | | | | 137/15.08 |
| 5,060,892 A * | 10/1991 | Dougherty | ............... | E03C 1/021 |
| | | | | 248/57 |
| 10,273,665 B2 * | 4/2019 | Braathen | ............... | F16L 5/10 |
| 10,468,865 B2 * | 11/2019 | Muenzenberger | ............... | F16L 5/04 |
| 2009/0211021 A1 * | 8/2009 | Gabriele | ............... | E03C 1/021 |
| | | | | 4/678 |

FOREIGN PATENT DOCUMENTS

| | | |
|---|---|---|
| GB | 2 539 315 A | 12/2016 |
| JP | H08-144334 A | 6/1996 |

\* cited by examiner

PIPE SHAFT MODULE

TECHNICAL FIELD OF THE INVENTION

The present invention relates to a pipe shaft module and to a method for mounting a pipe shaft module in a pipe shaft of a building.

BACKGROUND

When pipes are connected in a pipe shaft of a building this is often done inside a pipe connection box. Collecting all pipe connections inside pipe connection boxes is suitable because any leakage can more easily be detected and fixed. For example one pipe connection box could be provided for each floor in each pipe shaft of a building.

SUMMARY

An object of the invention is to provide a pipe shaft module allowing convenient mounting of pipes in a pipe shaft.

This is achieved by a pipe shaft module according to claim 1 and by a method for mounting a pipe shaft module in a pipe shaft of a building according to claim 13.

According to one aspect of the invention a pipe shaft module configured for being provided in a pipe shaft of a building and for being connected to at least one other pipe in the pipe shaft, said pipe shaft module comprising:
  a pipe connection box; and
  at least one pipe which is protruding into the pipe connection box and which is provided to the pipe connection box such that it can slide along its length direction in relation to the pipe connection box such that a first end of the at least one pipe is protruding more or less into the pipe connection box,
  wherein said pipe connection box comprises:
  a pipe connection device comprising at least one pipe connector for each pipe provided in the pipe shaft module, wherein said pipe connection device is mounted within the pipe connection box such that it can be moved within the pipe connection box into at least two different positions where one position is a connection position in which the pipe connectors are positioned such that one pipe connector can be connected to each pipe of the pipe shaft module; and
  at least one pipe receiving opening configured for receiving at least one pipe from another part of the pipe shaft of the building for connection with the at least on pipe of the pipe shaft module through the at least one pipe connector of the pipe connection device.

According to another aspect of the invention a method for mounting a pipe shaft module according to the invention in a pipe shaft of a building, said method comprising the steps of:
  providing a pipe shaft module according to the invention in a pipe shaft of a building;
  sliding the at least one pipe of the pipe shaft module in relation to the pipe connection box in a direction such that the at least one pipe after the sliding is protruding into the pipe connection box a smaller distance than before the sliding;
  moving the pipe connection device within the pipe connection box to the connection position such that the pipe connectors are positioned such that one pipe connector can be connected to each pipe of the pipe shaft module;
  connecting the first ends of each pipe with one pipe connector each.

Hereby, by using the pipe shaft module according to the invention an easy and convenient mounting of pipes in a pipe shaft is achieved. Furthermore all pipe connections will be provided inside a pipe connection box which is suitable for detection and repair of possible leakage in pipe connections. Furthermore, with a pipe shaft module according to the invention pipes and pipe connection box can be delivered together with the pipes already positioned to protrude into the pipe connection box. This will facilitate the mounting of pipes in the pipe shaft. The pipe shaft module, or for example one pipe shaft module for each floor of a building, is provided into the pipe shaft of the building and since the pipes already are provided as protruding into the pipe connection box there will be less process steps for the mounting compared to a conventional method where pipes and pipe connection boxes are delivered separately. According to the invention the pipes are then slid in relation to the pipe connection box such that the pipes are protruding more outside the pipe connection box compared to during delivery and thereafter pipe connectors provided inside the pipe connection box can be moved into a connection position. The pipe connectors can be pipe sections which can be almost as long as a height of the connection box. The possibility to move the pipe connectors within the pipe connection box allows the pipes to protrude inside the pipe connection box during delivery and before mounting of the pipe shaft module. Because a part of the pipes can be provided inside the pipe connection box, side by side with the pipe connectors, during delivery and during positioning of the pipe shaft module into the pipe shaft before connection of the pipes this will provide for a more convenient mounting procedure with a compact and easily handled pipe shaft module comprising both a pipe connection box and pipes.

In one embodiment of the invention said pipe connection device can be moved into a first position which is a position where each pipe connector is provided in a position not being in a length extension direction of the at least one pipe of the pipe shaft module and a second position which is the connection position.

In one embodiment of the invention each pipe connector comprises a fluid path, said fluid path being an extension of said at least one pipe when the pipe connector is connected to said at least one pipe in the connection position.

In one embodiment of the invention each fluid path has a length being at least half a height of the pipe connection box.

In one embodiment of the invention said height of the pipe connection box is between 0.3-1.5 m.

In one embodiment of the invention said pipe connectors are pipe sections comprising fluid paths, said pipe sections being arranged in parallel with each other and provided such that said fluid paths are provided along a direction being substantially the same as a length direction of the at least one pipe of the pipe shaft module.

In one embodiment of the invention said pipe connection device is mounted within the pipe connection box such that it can be moved within the pipe connection box in a substantially transverse direction in relation to a length extension direction of the at least one pipe of the pipe shaft module.

In one embodiment of the invention the pipe shaft module comprises at least two pipes mounted to the pipe connection box and wherein said pipe connection device comprises at least two pipe connectors and wherein said pipe connection box comprises at least two pipe receiving openings. In one embodiment of the invention the pipe shaft module comprises three pipes, three pipe connectors and three pipe receiving openings.

In one embodiment of the invention said pipe shaft module can be provided in a first mounting stage before it is mounted in a pipe shaft to other pipes, wherein in said first mounting stage the at least one pipe is provided protruding into the pipe connection box at least half of a total height of the pipe connection box and wherein said pipe connection device in the first mounting stage is provided in a first position where said at least one pipe connector is provided in parallel with said at least one pipe.

In one embodiment of the invention it further comprises a pipe holding device provided outside the pipe connection box and being connected to each pipe allowing the pipes to be slid in relation to the pipe connection box together.

In one embodiment of the invention the pipe shaft module further comprises at least one guide rail along which said pipe holding device can be guided for sliding the pipes to protrude more or less into the pipe connection box, wherein said at least one guide rail comprises at least one locking feature which is configured for locking the pipe holding device in at least two different positions in relation to the at least one guide rail thereby allowing at least two different positions where the pipes protrude a different amount into the pipe connection box.

In one embodiment of the invention it is configured for being connected to another pipe shaft module according to the invention.

In one embodiment of the invention the method further comprises the step of connecting a second end being the opposite end from the first end of the at least one pipe with a pipe connector of another pipe shaft module according to the invention, which other pipe shaft module has been provided in another part of the pipe shaft.

In one embodiment of the invention the method further comprises the step of connecting each pipe connector of the first pipe shaft module with a second end of one pipe each from another pipe shaft module which has been provided in another part of the pipe shaft such that two pipes from different pipe shaft modules are connected through each pipe connector.

In one embodiment of the invention the method further comprises a step of isolating the parts of the tubes which after connection are provided outside the pipe connection box.

In one embodiment of the invention the step of sliding the at least one pipe of the pipe shaft module in relation to the pipe connection box is provided by guiding a pipe holding device which is holding the pipes outside the pipe connection box along guide rails and locking said pipe holding device to the guide rails in at least two different positions.

DETAILED DESCRIPTION OF THE EMBODIMENTS

Figure 1A:
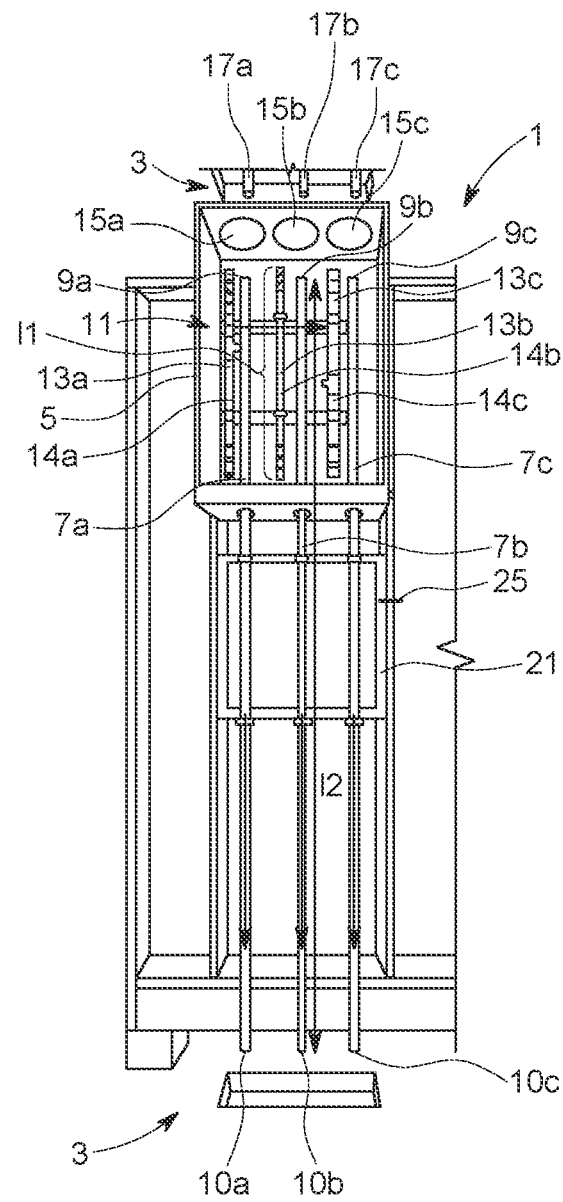
FIG. 1a shows schematically a pipe shaft module according to one embodiment of the invention in a first mounting stage and provided into a pipe shaft of a building.

FIGS. 1a-1d show schematically a pipe shaft module 1 according to one embodiment of the invention in different mounting stages. In FIG. 1a the pipe shaft module 1 is in a first mounting stage, which is a delivery stage, in FIG. 1b the pipe shaft module is in a second mounting stage where the pipes have been slid down and in FIG. 1c the pipe shaft module 1 is in a third mounting stage which is a connection stage and in FIG. 1d the pipe shaft is in a fourth mounting stage where the module has been connected to another pipe shaft module.

The pipe shaft module 1 according to the invention is configured for being provided in a pipe shaft 3 of a building and for being connected to at least one other pipe in the pipe shaft. The pipe shaft module 1 comprises a pipe connection box 5. Connection of pipes in the pipe shaft of the building will be provided inside the pipe connection box 5. The pipe shaft module according to the invention comprises furthermore at least one pipe 7a,b,c which is protruding into the pipe connection box 5 and which is provided to the pipe connection box such that it can slide along its length direction in relation to the pipe connection box such that a first end 9a,b,c of the at least one pipe 7a,b,c is protruding more or less into the pipe connection box 5. In the embodiment of the invention as shown in FIGS. 1a-1d three pipes 7a,b,c are provided in the pipe shaft module 1. However another number of pipes could as well be provided according to the invention. For example one or two pipes or more than three pipes could be provided. If three pipes 7a,b,c are provided one pipe can be for warm water, one for cold water and one for warm water circulation. The pipes could also be used for heating or cooling systems, i.e. heating media and cooling media can be provided in the pipes.

Furthermore according to the invention said pipe connection box 5 comprises a pipe connection device 11 comprising at least one pipe connector 13a,b,c for each pipe 7a,b,c provided in the pipe shaft module 1. In this embodiment of the invention three pipe connectors 13a,b,c are provided however another number of pipe connectors could as well be provided. The pipe connectors 13a,b,c comprise each a fluid path 14a,b,c. The fluid paths 14a,b,c will be extensions of said pipes 7a,b,c when the pipe connectors 13a,b,c are connected to said pipes 7a,b,c in a connection position. Each fluid path 14a,b,c has a length which can be equal to for example at least half a height h of the pipe connection box 5. The length of the fluid paths 14a,b,c can also be almost the same as the height h of the pipe connection box 5 however saving room for pipe connections to be provided inside the pipe connection box 5. A height of the pipe connection box 5 can be for example between 0.3-1.5 m or 0.5-1.2 m.

In the embodiment of the invention as shown in FIGS. 1a-1d the pipe connectors 13a,b,c are pipe sections 13a,b,c which are arranged in parallel with each other and provided with their fluid paths 14a,b,c along a direction being substantially the same as a length direction of the pipes 7a,b,c of the pipe shaft module 1. An alternative to pipe sections could be a block with drilled holes. The length l1 of the pipe connectors 13a,b,c can be for example at least half the height h of the connection box or almost as long as the height h of the pipe connection box 5. Suitably the length l1 of the pipe connectors 13a,b,c are a bit shorter than the height h of the pipe connection box 5 because the connections to pipes in both ends of the pipe connectors 13a,b,c should be provided inside the pipe connection box 5. The length l1 of the pipe connectors 13a,b,c (and thus also the length of the fluid paths 14a,b,c) and the height h of the connection box 5 is an important detail of the invention because a length l2 of the pipes 7a,b,c provided in the pipe shaft module can be reduced by the same length as the length l1 of the pipe connectors 13a,b,c. An upper part (referring to directions in the drawings) of the pipes 7a,b,c and the pipe connectors 13a,b,c will be provided side by side within the pipe connection box 5 during delivery and during a first mounting stage, see FIG. 1a. A total length of the pipe shaft module during delivery and during the first mounting stage is hereby reduced and handling and mounting of the pipe shaft module is facilitated. A length l1 of the pipe connectors 13a,b,c and a height h of the pipe connection box 5 can be adapted to a thickness of joists between floors in a building. Hereby mounting is facilitated. Hereby a total length of the pipe shaft module in delivery position can be adapted to a ceiling height of a floor of a building and hereby mounting will be facilitated. Said pipe connection device 11 is according to the invention mounted within the pipe connection box 5 such that it can be moved within the pipe connection box 5 into at least two different positions where one position is a connection position in which the pipe connectors 13a,b,c are positioned such that one pipe connector 13a,b,c can be connected to each pipe 7a,b,c of the pipe shaft module 1. The pipe connectors 13a,b,c are connected to the first ends 9a,b,c of the pipes 7a,b,c. The pipe connectors 13a,b,c are for example mounted in fixed positions to the pipe connection device 11 and the pipe connection device 11 can be moved to the different positions. A first position is called a delivery position and in this position the pipe connectors 13a,b,c are provided not in line with the pipes 7a,b,c, i.e. each pipe connector 13a,b,c is provided in a position not being in a length extension direction of the pipes 7a,b,c of the pipe shaft module 1. A second position is called a connection position and in this position the pipe connectors 13a,b,c have been moved into a position where they can be connected to one pipe each. In this embodiment the pipe connection device 11 is mounted within the pipe connection box 5 such that it can be moved within the pipe connection box in a substantially transverse direction in relation to a length extension of pipes 7a,b,c of the pipe shaft module. In the embodiment shown in FIGS. 1a-1d the pipe connection device 11 is moved between a delivery position and a connection position by moving it from left to right. The delivery position could as well be on the other side of the pipes and in front of the pipes or behind the pipes, i.e. the connection device 11 could as well be moved forward or backward in relation to the pipes 7a,b,c and with reference to directions in the drawings. In another embodiment of the invention the direction of movement of the pipe connection device 11 need not to be transverse to the length extension of the pipes but could be in any angle.

Figure 1B:
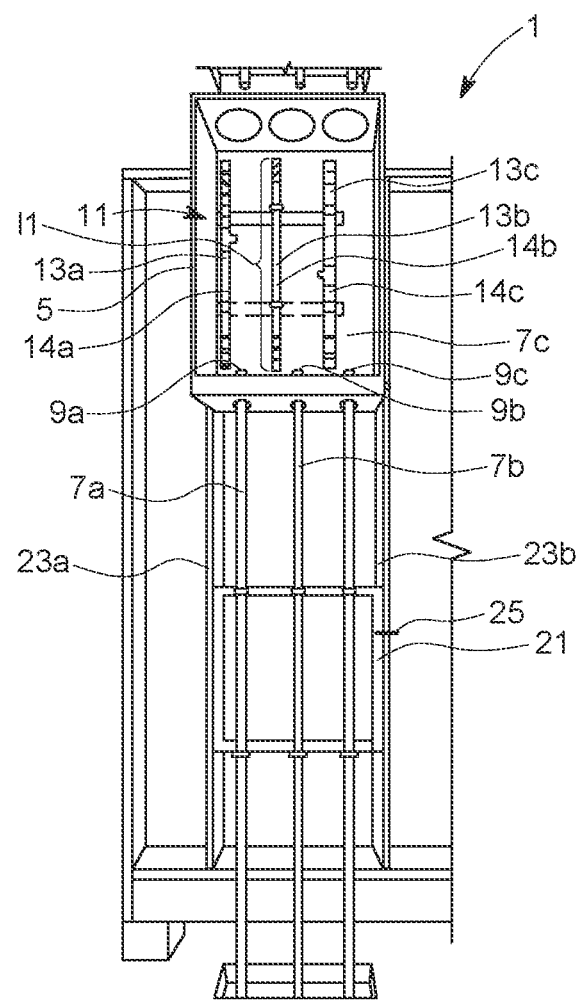
FIG. 1b shows schematically the same pipe shaft module as shown in FIG. 1a in a second mounting stage where the pipes have been slid down to protrude less into the connection box.
Figure 1C:
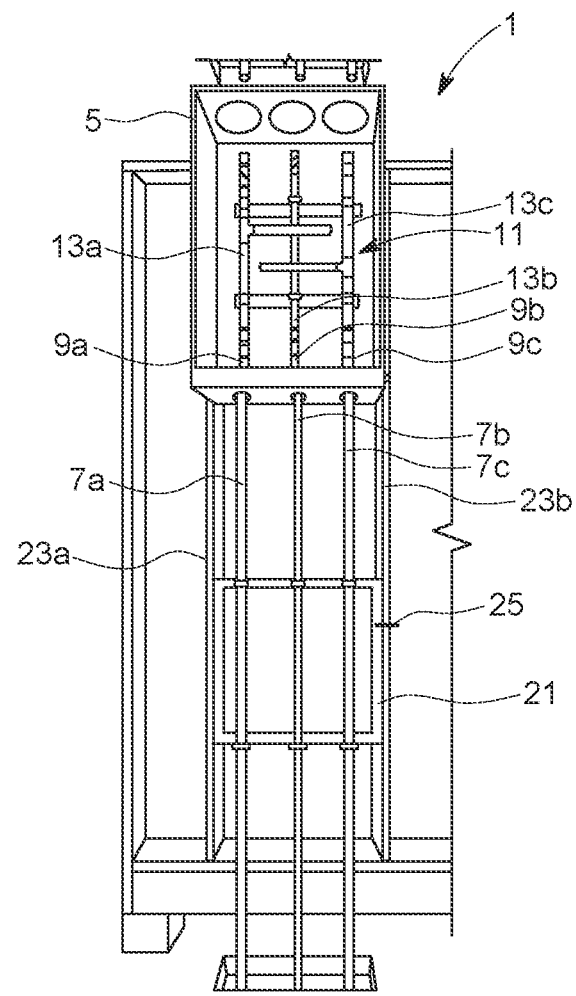
FIG. 1c shows schematically the same pipe shaft module as shown in FIGS. 1a and 1b but in a third mounting stage which is a connection stage.

The pipe sections 13a,b,c will in the third mounting stage, as shown in FIG. 1c, be provided as extensions of the pipes 7a,b,c but before the pipe connection device 11 can be moved into the second position (connection position) the pipes 7a,b,c need to be slid in relation to the pipe connection box 5 in a direction such that the pipes 7a,b,c after the sliding is protruding into the pipe connection box 5 a smaller distance than before the sliding. I.e. in the first mounting stage, which is a delivery stage the pipes 7a,b,c are protruding into the pipe connection box more than in the second and third mounting stages. This is possible thanks to the possibility to move the pipe connection device 11 within the pipe connection box 5. By providing the pipe connectors 13a,b,c away from the length extension of the pipes 7a,b,c the pipes can be slid to protrude further into the pipe connection box 5 during delivery. Herby a more compact module is achieved. Hereby, when moving from the first mounting stage (FIG. 1a) to the second mounting stage (FIG. 1b) the pipes 7a,b,c are slid such that they protrude less into the pipe connection box 5 and when moving from the second to the third mounting stage the pipe connection device 11 is moved from the first position to the second position. In the second position of the pipe connection device 11 one pipe section (pipe connector) 13a,b,c is provided in the same length direction as each of the pipes 7a,b,c as extensions of the pipes. Thereafter the pipes 7a,b,c can be connected to the pipe connectors 13a,b,c.

The height h of the pipe connection box 5 can be adopted such that a convenient and easily handled pipe shaft module is provided. The pipes 7a,b,c can for example in the first mounting stage be protruding inside the pipe connection box 5 along almost the whole height h of the box or at least half of the height.

The pipe connection box comprises furthermore at least one pipe receiving opening 15a,b,c configured for receiving at least one pipe 17a,b,c from another part of the pipe shaft 3 of the building for connection with the at least on pipe 7a,b,c of the pipe shaft module 1 through the at least one pipe connector 13a,b,c of the pipe connection device 11. In this embodiment of the invention three pipe receiving openings 15a,b,c are provided in the pipe connection box 5. These pipe receiving openings 15a,b,c are provided in an opposite side of the pipe connection box 5 from where the pipes 7a,b,c are protruding into the pipe connection box 5. Furthermore the pipe receiving openings 15a,b,c are positioned along an extended length direction of each pipe 7a,b,c such that pipes 17a,b,c from another pipe shaft module which are received through the pipe receiving openings 15a,b,c can be connected one each to the pipes 7a,b,c of the present pipe shaft module 1 through the pipe connectors 13a,b,c.

In this embodiment of the invention the pipe shaft module 1 further comprises a pipe holding device 21 provided outside the pipe connection box 5 for holding the pipes 7a,b,c together such that they can be slid together. However this feature is optional and not necessary for the invention. The pipe holding device 21 is connected to each pipe 7a,b,c and allows the pipes to be slid in relation to the pipe connection box 5 together. In this embodiment of the invention the pipe shaft module further comprises guide rails 23a, 23b along which said pipe holding device 21 can be guided for sliding the pipes to protrude more or less into the pipe connection box 5. Said guide rails 23a, 23b comprise at least one locking feature 25 which is configured for locking the pipe holding device 21 in at least two different positions in relation to the guide rails 23a, 23b thereby allowing at least two different positions for the pipes 7a,b,c where the pipes protrude a different amount into the pipe connection box 5. In another embodiment only one guide rail is provided for example in a middle position behind the pipes.

The pipe shaft module according to the invention is configured for being connected to another pipe shaft module 1 according to the invention. For example one pipe shaft module 1 can be provided for each floor in a pipe shaft of a building. A second end 10a,b,c of the pipes 7a,b,c can be provided such that they protrude down to a floor below where they can be received through pipe receiving openings 15a,b,c of another pipe shaft module 1 which is provided in the pipe shaft at the floor below.

Figure 2:
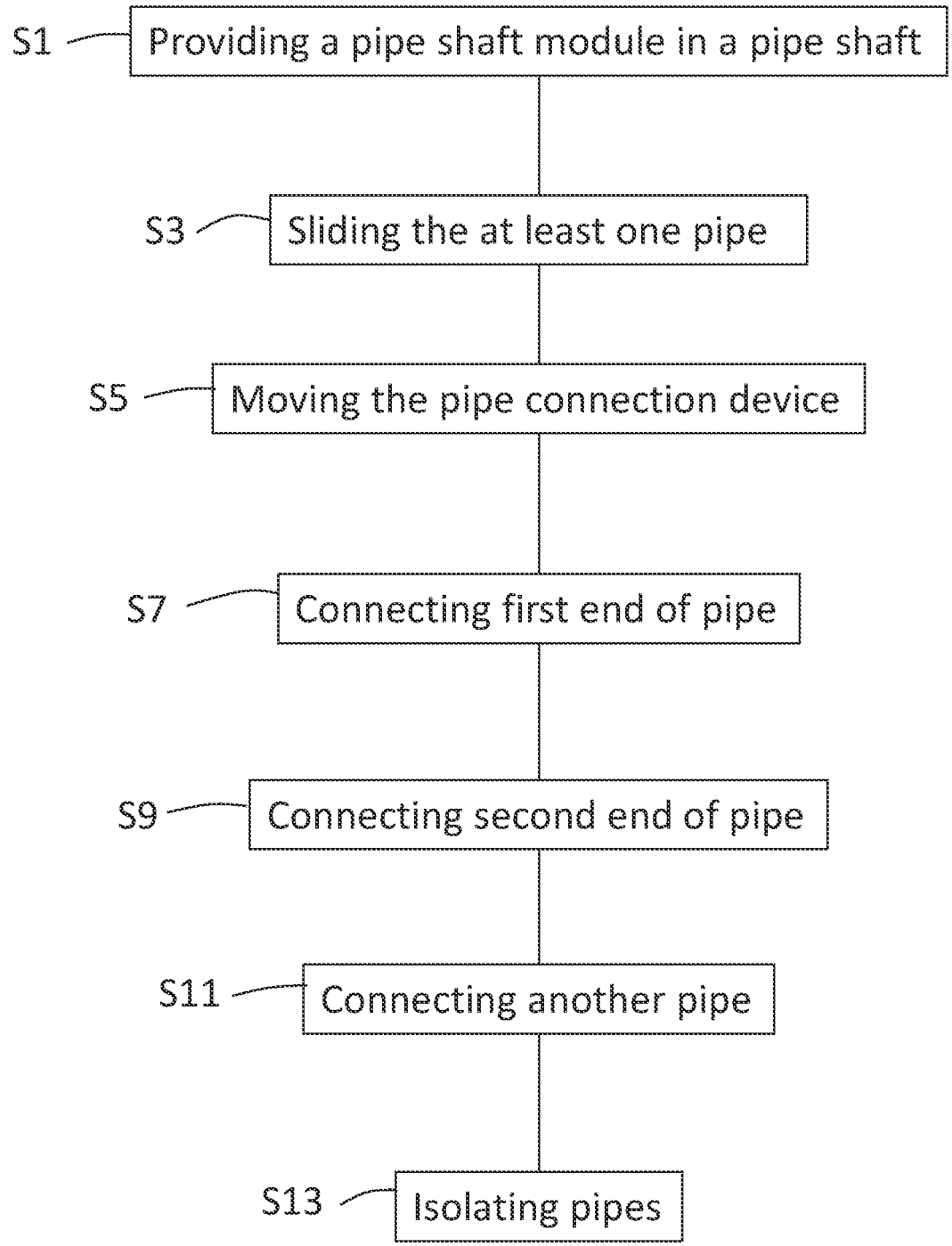
FIG. 2 is a flow chart of a method according to one embodiment of the invention.

FIG. 2 is a flow chart of a method for mounting a pipe shaft module 1 as described above in a pipe shaft 3 of a building according to one embodiment of the invention. The method steps are described in order below:

S1: Providing a pipe shaft module 1 as described above in relation to FIGS. 1a-1d in a pipe shaft 3 of a building. The pipe shaft module is provided in a first mounting stage as described in relation to FIG. 1a when it is delivered and positioned into the pipe shaft 3.

S3: Sliding the at least one pipe 7a,b,c of the pipe shaft module 1 in relation to the pipe connection box 5 in a direction such that the at least one pipe 7a,b,c after the sliding is protruding into the pipe connection box 5 a smaller distance than before the sliding. This is the second mounting stage as shown in FIG. 1b. If a pipe holding device 21 is provided as described above (however not necessary) the step of sliding S3 can be provided by guiding the pipe holding device 21 which is holding the pipes 7a,b,c outside the pipe connection box 5 along at least one guide rail 23a, 23b and locking said pipe holding device 21 to the at least one guide rail 23a, 23b in at least two different positions.

S5: Moving the pipe connection device 11 within the pipe connection box 5 to the connection position such that the pipe connectors 13a,b,c are positioned such that one pipe connector 13a,b,c can be connected to each pipe 7a,b,c of the pipe shaft module 1.

S7: Connecting the first ends 9a,b,c of each pipe 7a,b,c with one pipe connector 13a,b,c each. This is the third mounting stage as shown in FIG. 1c.

S9: Connecting a second end 10a,b,c being the opposite end from the first end 9a,b,c of the at least one pipe 7a,b,c with a pipe connector 13a,b,c of another pipe shaft module 1 according to the invention, which other pipe shaft module 1 has been provided in another part of the pipe shaft 3.

Figure 1D:
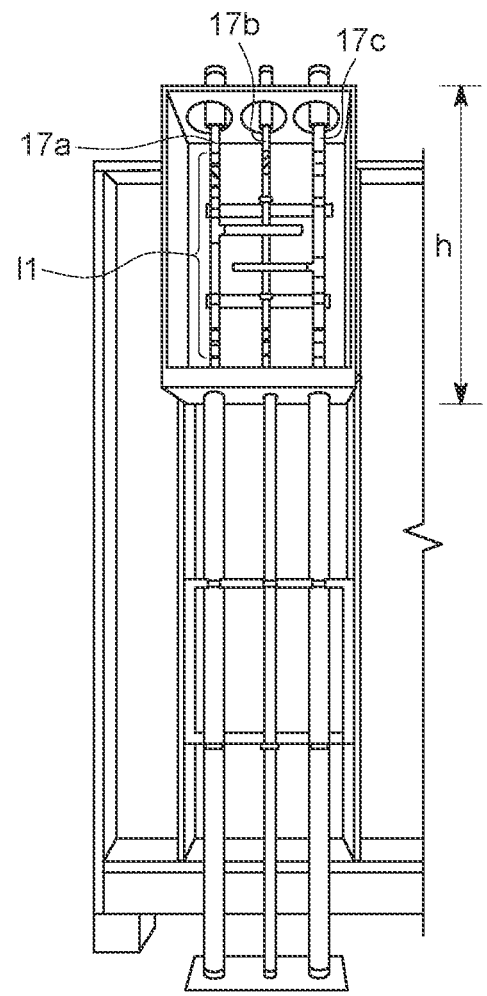
FIG. 1d shows schematically the same pipe shaft module as shown in FIGS. 1a-1c in a fourth mounting stage when connected to pipes from another pipe shaft module.

And/Or:

S11: Connecting each pipe connector 13a,b,c of the pipe shaft module 1 with a second end 10a,b,c of one pipe 7a,b,c each from another pipe shaft module 1 which has been provided in another part of the pipe shaft 3 such that two pipes from different pipe shaft modules are connected through each pipe connector 13a,b,c. In FIG. 1d such second ends of pipes coming from another pipe shaft module are numbered 17a, 17b, 17c. However these pipes 17a, 17b, 17c are not necessarily coming from a pipe shaft module according to the invention but could be other pipes provided in the building.

The steps S9 and S11 need not always be provided both because a pipe shaft module 1 according to the invention can be the first or the last in a row of pipe shaft modules 1 according to the invention which are connected to each other in a pipe shaft 3 of a building.

Optionally a step S13 of isolating the parts of the tubes 7a,b,c which after connection are provided outside the pipe connection box 5 is provided. Isolation is shown provided to the pipes in FIG. 1d however the isolation is not necessary for the invention.

The invention claimed is:

1. A pipe shaft module (1) configured for being provided in a pipe shaft (3) of a building and for being connected to at least one other pipe in the pipe shaft, said pipe shaft module (1) comprising:
a pipe connection box (5); and
at least one pipe (7a,b,c) which is protruding into the pipe connection box (5) and provided to the pipe connection box such that it can slide along its length direction in relation to the pipe connection box with a first end (9a,b,c) of the at least one pipe (7a,b,c) protruding more or less into the pipe connection box (5), wherein said pipe connection box (5) comprises:
a pipe connection device (11) comprising at least one pipe connector (13a,b,c) for each pipe (7a,b,c) provided in the pipe shaft module (1), and said pipe connection device (11) is mounted within the pipe connection box (5) such that it can be moved within the pipe connection box (5) into at least two different positions where one position is a connection position in which the pipe connectors (13a,b,c) are positioned such that one pipe connector (13a,b,c) can be connected to each pipe (7a,b,c) of the pipe shaft module (1); and
at least one pipe receiving opening (15a,b,c) configured for receiving at least one pipe (17a,b,c) from another part of the pipe shaft (3) of the building for connection with the at least on pipe (7a,b,c) of the pipe shaft module (1) through the at least one pipe connector (13a,b,c) of the pipe connection device (11).

2. A pipe shaft module according to claim 1, wherein said pipe connection device (11) can be moved into a first position which is a position where each pipe connector (13a,b,c) is provided in a position not being in a length extension direction of the at least one pipe (7a,b,c) of the pipe shaft module (1) and a second position which is the connection position.

3. A pipe shaft module according to claim 2, wherein each pipe connector (13a,b,c) comprises a fluid path (14a,b,c), said fluid path being an extension of said at least one pipe (7a,b,c) when the pipe connector (13a,b,c) is connected to said at least one pipe (7a,b,c) in the connection position.

4. A pipe shaft module according to claim 3, wherein each fluid path (14a,b,c) has a length (l1) being at least half a height (h) of the pipe connection box (5).

5. A pipe shaft module according to claim 4, wherein said height (h) of the pipe connection box (5) is between 0.3-1.5 m.

6. A pipe shaft module according to claim 1, wherein each pipe connector (13a,b,c) comprises a fluid path (14a,b,c), said fluid path being an extension of said at least one pipe (7a,b,c) when the pipe connector (13a,b,c) is connected to said at least one pipe (7a,b,c) in the connection position.

7. A pipe shaft module according to claim 6, wherein each fluid path (14a,b,c) has a length (l1) being at least half a height (h) of the pipe connection box (5).

8. A pipe shaft module according to claim 7, wherein said height (h) of the pipe connection box (5) is between 0.3-1.5 m.

9. A pipe shaft module according to claim 1, wherein said pipe connectors (13a,b,c) are pipe sections comprising fluid paths (14a,b,c), said pipe sections being arranged in parallel with each other and provided such that said fluid paths (14a,b,c) are provided along a direction being substantially the same as a length direction of the at least one pipe (7a,b,c) of the pipe shaft module (1).

10. A pipe shaft module according to claim 1, wherein said pipe connection device (11) is mounted within the pipe connection box (5) such that it can be moved within the pipe connection box in a substantially transverse direction in relation to a length extension direction of the at least one pipe (7a,b,c) of the pipe shaft module.

11. A pipe shaft module according to claim 1, comprising at least two pipes (7a,b,c) mounted to the pipe connection box (5), wherein said pipe connection device (11) comprises at least two pipe connectors (13*a,b,c*) and said pipe connection box (5) comprises at least two pipe receiving openings (15*a,b,c*).

12. A pipe shaft module according to claim 1, wherein said pipe shaft module can be provided in a first mounting stage before it is mounted in a pipe shaft to other pipes, in said first mounting stage the at least one pipe (7*a,b,c*) is provided protruding into the pipe connection box (5) at least half of a total height (h) of the pipe connection box (5), and said pipe connection device (11) in the first mounting stage is provided in a first position where said at least one pipe connector (13*a,b,c*) is provided in parallel with said at least one pipe (7*a,b,c*).

13. A pipe shaft module according to claim 1, wherein it further comprises a pipe holding device (21) provided outside the pipe connection box (5) and being connected to each pipe (7*a,b,c*) allowing the pipes to be slid in relation to the pipe connection box (5) together.

14. A pipe shaft module according to claim 13, further comprising at least one guide rail (23*a*, 23*b*) along which said pipe holding device (21) can be guided for sliding the pipes to protrude more or less into the pipe connection box (5), wherein said at least one guide rail comprises at least one locking feature (25) which is configured for locking the pipe holding device (21) in at least two different positions in relation to the at least one guide rail thereby allowing at least two different positions where the pipes protrude a different amount into the pipe connection box (5).

15. A pipe shaft module according to claim 1, wherein it is configured for being connected to another pipe shaft module (1).

16. A method for mounting the pipe shaft module (1) according to claim 1 in the pipe shaft (3) of a building, said method comprising the steps of:
providing (S1) the pipe shaft module (1) in the pipe shaft (3) of a building;
sliding (S3) the at least one pipe (7*a,b,c*) of the pipe shaft module (1) in relation to the pipe connection box (5) in a direction such that the at least one pipe (7*a,b,c*) after the sliding is protruding into the pipe connection box (5) a smaller distance than before the sliding;
moving (S5) the pipe connection device (11) within the pipe connection box (5) to the connection position such that the pipe connectors (13*a,b,c*) are positioned so one pipe connector (13*a,b,c*) can be connected to each pipe (7*a,b,c*) of the pipe shaft module (1); and
connecting (S7) the first ends (9*a,b,c*) of each pipe (7*a,b,c*) with one pipe connector (13*a,b,c*) each.

17. A method according to claim 16, further comprising the step of:
connecting (S9) a second end (10*a,b,c*) being the opposite end from the first end (9*a,b,c*) of the at least one pipe (7*a,b,c*) with a pipe connector (13*a,b,c*) of another pipe shaft module (1), which other pipe shaft module (1) has been provided in another part of the pipe shaft (3).

18. A method according to claim 16, further comprising the step of:
connecting (S11) each pipe connector (13*a,b,c*) of the first pipe shaft module (1) with a second end (10*a,b,c*) of one pipe (7*a,b,c*) each from another pipe shaft module (1) which has been provided in another part of the pipe shaft (3) such that two pipes from different pipe shaft modules are connected through each pipe connector (13*a,b,c*).

19. A method according to claim 16, further comprising a step of isolating (S13) the parts of the tubes (7*a,b,c*) which after connection are provided outside the pipe connection box (5).

20. A method according to claim 16, wherein the step of sliding (S3) the at least one pipe (7*a,b,c*) of the pipe shaft module (1) in relation to the pipe connection box (5) is provided by guiding a pipe holding device (21) which is holding the pipes (7*a,b,c*) outside the pipe connection box (5) along at least one guide rail (23*a*, 23*b*) and locking said pipe holding device (21) to the at least one guide rail (23*a*, 23*b*) in at least two different positions.

* * * * *